(12) United States Patent
Lu

(10) Patent No.: US 10,865,766 B2
(45) Date of Patent: Dec. 15, 2020

(54) DUCTED AND BALANCED WIND TURBINE

(71) Applicant: Jirong Lu, Beijing (CN)

(72) Inventor: Jirong Lu, Beijing (CN)

(*) Notice: Subject to any disclaimer, the term of this patent is extended or adjusted under 35 U.S.C. 154(b) by 0 days.

(21) Appl. No.: 16/729,385

(22) Filed: Dec. 28, 2019

(65) Prior Publication Data

US 2020/0141381 A1    May 7, 2020

Related U.S. Application Data

(63) Continuation of application No. PCT/CN2018/000133, filed on Apr. 9, 2018.

(30) Foreign Application Priority Data

Aug. 7, 2017 (CN) .......................... 2017 1 0664123

(51) Int. Cl.
| | | |
|---|---|---|
| F03D 1/04 | (2006.01) | |
| F03D 80/70 | (2016.01) | |
| F03D 9/25 | (2016.01) | |
| F03D 1/02 | (2006.01) | |
| F03D 9/32 | (2016.01) | |

(52) U.S. Cl.
CPC ............... F03D 1/04 (2013.01); F03D 1/025 (2013.01); F03D 9/25 (2016.05); F03D 9/32 (2016.05); F03D 80/70 (2016.05); *F05B 2240/51* (2013.01); *F05B 2240/92* (2013.01); *F05B 2240/923* (2013.01)

(58) Field of Classification Search
CPC ... F03D 1/02; F03D 1/025; F03D 1/04; F03D 9/25; F03D 9/32; F03D 80/70; F03D 2240/51; F03D 2240/511; F03D 2240/515; F03D 2240/92; F03D 2240/923; Y02E 10/728; F05B 2240/923
See application file for complete search history.

(56) References Cited

U.S. PATENT DOCUMENTS 7,582,982 B1    9/2009  Deal
2014/0008915 A1  1/2014  Ribarov

FOREIGN PATENT DOCUMENTS

| CN | 1869437 A | 11/2006 | |
|---|---|---|---|
| CN | 101555905 A | 10/2009 | |
| CN | 102734073 A | * 10/2012 | |
| CN | 106988965 A | 7/2017 | |
| CN | 207245935 U | 4/2018 | |
| DE | 743672 C | * 12/1943 | ............... F03D 1/04 |

* cited by examiner

*Primary Examiner* — Kenneth Bomberg
*Assistant Examiner* — Jesse M Prager
(74) *Attorney, Agent, or Firm* — Wayne & Ken, LLC; Tony Hom

(57) ABSTRACT

Disclosed is a ducted and balanced wind turbine, including: a spindle, a front cross bearing bracket, a radial magnetic levitation bearing, a cross bracket, an outer rotor vortex blade, a turbine shell, an outer rotor rotating body, an outer rotor armature coil, a conductive slip ring, an axial magnetic levitation bearing cross bracket, an axial magnetic leverage bearing, a rear cross bearing bracket, a spindle rolling bearing, an output wire, a carbon brush set, a permanent magnet, an inner rotor rotating body, an inner rotor vortex blade, an outer rotor dome, and a spindle dome. The radial and axial magnetic levitation devices and the carbon brush set are mounted on the inner wall of the turbine shell, forcing the outer rotor rotating body to rotate freely in the turbine shell through the magnetic levitation bearings.

6 Claims, 5 Drawing Sheets

DUCTED AND BALANCED WIND TURBINE

CROSS-REFERENCE TO RELATED APPLICATIONS

This application is a continuation of International Application No. PCT/CN2018/000133 with a filing date of Apr. 9, 2018, designating the United states, and further claims to the benefit of priority from Chinese Patent Application No. 201710664123.9, filed on Aug. 7, 2017. The content of the aforementioned application, including any intervening amendments thereto, is incorporated herein by reference in its entirety.

TECHNICAL FIELD

The present application relates to wind turbines, and more particularly to a ducted and balanced wind turbine.

BACKGROUND

A conventional wind turbine comprises a stator and a rotor. The stator is required to be fixed with a base of the wind turbine which has an inner or outer rotor, so that under the wind power, the rotor rotates to cut magnetic field lines of force, thereby achieving power generation by energy conversion. During the cycle process in which a armature coil cuts the magnetic field lines of force, the closed armature coil can induce a current, forming an electromotive force of the armature coil. At this time, the electromotive force of the armature coil and the magnetic field of the wind turbine generates a torque form of magnetic field resistance. According to the action and reaction of Newton's third law of motion, the wind energy for driving the rotating armature coil is disturbed by the reaction of the resistance energy of the magnetic field torque force. The direction of the resistance energy is opposite to that of the wind energy, and the magnitude of the resistance energy is equal to that of the wind energy acting on the rotating armature coil.

Since the base of the conventional wind turbine is fixedly mounted on a tower frame, the torque form of the magnetic field resistance can be transmitted to the tower frame through the base of the wind turbine, and finally absorbed by the earth through the tower frame. Therefore, there is no interference of the air resistance in the conventional wind turbine. When the conventional wind turbine is mounted on flying electric aircrafts, if the wind energy acting on the rotor impeller of the wind turbine intends to drive the rotor to cut the magnetic lines of the stator magnetic field, the resistance energy of the magnetic field will be transferred to the base of the wind turbine through the stator, and then transferred to the flying electric aircraft, thus forcing electric aircrafts based on the original driving force to increase the energy consumption of the engine due to the resistance of the magnetic field.

Therefore, the magnetic resistance of the wind turbine is usually summarized as an air resistance. Technically, it should be the reaction force of the magnetic resistance of the wind turbine to the air. Due to the reaction force of the wind turbine, human has never been involved in the technical route of wind power generation using the reaction force energy in air resistance on an electric aircraft, a high-speed passenger train, a high-speed long-distance electric vehicle, etc.

Since the conventional wind turbine lacks technical designs, it cannot be mounted on the flying electric aircraft, the high-speed electric passenger train and the long-distance electric vehicle to develop the mobile wind power generation technology, and directly provide the power energy needed for the flying or driving device. Therefore, it is impossible for the conventional wind turbine to convert the energy in the air of the electric aircraft, the high-speed electric passenger train and high-speed long-distance electric vehicle into the electric energy.

SUMMARY

The purpose of the present invention is to provide a ducted and balanced wind turbine, which is used to solve the technical defects that conventional wind turbine cannot be applied to an electric airplane, a high-speed electric passenger train and a high-speed long-distance electric bus. In order to achieve the purpose of establishing a wind generation system on an electric airplane, a high-speed electric passenger train, and a high-speed long-distance electric vehicle, the invention provides a design which is based on the theory of action and reaction of Newton's third law of motion and the conditions of the three elements of "size, direction, action point" in classical mechanics. In an electric aircraft, a high-speed electric passenger train and a high-speed long-distance electric vehicle, by designing the cut-in angle of an inner rotor vortex blade and an outer rotor vortex blade of a wind turbine, the air entering the wind turbine is divided into two and becomes a pair of equal forces of the wind turbine acting on the inner rotor vortex blade and the outer rotor vortex blade of the wind turbine respectively. As long as the forces acting on the inner rotor and the outer rotor are equal, a torque force equilibrium action point is formed in the resistance of the magnetic field energy provided by the wind turbine. At this time, the resistance form of the magnetic field energy will not be transmitted to the electric airplane, the high-speed electric passenger train and the high-speed long-distance electric vehicle through a turbine shell of the wind turbine. The pair of balancing forces acting on the inner and outer rotors of the wind turbine has completed cutting the magnetic field lines of force and achieves the wind power generation during flying or driving.

The invention provides a ducted and balanced wind turbine, comprising: a spindle, a front cross bearing bracket, a first radial magnetic levitation bearing, a second radial magnetic levitation bearing, a third radial magnetic levitation bearing, a fourth radial magnetic levitation bearing, a first cross bracket, a second cross bracket, a third diameter cross bracket, a fourth cross bracket, an outer rotor vortex blade, a turbine shell, an outer rotor rotating body, an outer rotor armature coil, a conductive slip ring, a first cross thrust bracket, a second cross thrust bracket, a first axial magnetic levitation bearing, a second axial magnetic levitation bearing, a rear cross bearing bracket, a first spindle rolling bearing, a second spindle rolling bearing, an output wire, a carbon brush set, a permanent magnet, an inner rotor rotating body, an inner rotor vortex blade, an outer rotor dome and a spindle dome;

the spindle is mounted in the turbine shell of a wind turbine through the front cross bearing bracket and the rear cross bearing bracket;

the first spindle rolling bearing is arranged between the spindle and the front cross bearing bracket, and the second spindle rolling bearing is arranged between the spindle and the rear cross bearing bracket;

the inner rotor vortex blade is fixedly mounted on the spindle; the inner rotor rotating body is fixedly mounted on the inner rotor vortex blade; the permanent magnet is fixedly mounted on the inner rotor rotating body;

the outer rotor armature coil is positioned outside the permanent magnet and is fixedly mounted inside the outer rotor rotating body; a gap is provided between the outer rotor armature coil and the permanent magnet; the outer rotor vortex blade and the conductive slip ring are fixedly mounted outside the outer rotor rotating body;

the first radial magnetic levitation bearing, the second radial magnetic levitation bearing, the third radial magnetic levitation bearing, and the fourth radial magnetic levitation bearing are respectively mounted in the inner wall of the turbine shell via the first cross bracket, the second cross bracket, the third cross bracket, the fourth cross bracket;

the first axial magnetic levitation bearing and the second axial magnetic levitation bearing are fixedly installed at the rear cross bearing bracket; the carbon brush set is positioned outside the conductive slip ring and is fixedly installed on the inner wall of the turbine shell;

the outer rotor rotating body is rotated inside the turbine shell through the first radial magnetic levitation bearing, the second radial magnetic levitation bearing, the third radial magnetic levitation bearing, the fourth radial magnetic levitation bearing, the first axial magnetic levitation bearing and the second axial magnetic levitation bearing; the inner rotor vortex blade and the outer rotor vortex blade have different inclination angles, forming a pair of tangential forces which has the same energy and opposite directions, so that the inner rotor rotating body and the outer rotor rotating body of the wind turbine rotate in opposite directions.

Further, the spindle is positioned at a center of the turbine shell of the wind turbine.

Further, one end of the first cross thrust bracket and the second cross thrust bracket are mounted on the inner wall of the turbine shell of the wind turbine, and the other end of the first cross thrust bracket and the second cross thrust bracket are respectively positioned between two magnetic poles of the first axial magnetic levitation bearing and between the two magnetic poles of the second axial magnetic levitation bearing.

Further, first poles of the first radial magnetic levitation bearing, the second radial magnetic levitation bearing, the third radial magnetic levitation bearing, and the fourth radial magnetic levitation bearing are arranged in the outer rotor rotating body; second poles which has the same polarity with the first poles are respectively arranged on ends of the first cross bracket, the second cross bracket, and the third cross bracket, the fourth cross bracket which are far from the inner wall of the turbine shell; the third poles of the first axial magnetic levitation bearing and the second axial magnetic levitation bearing are mounted on the rear of the outer rotor rotating body; and fourth poles which have the same polarity with the third poles are installed at the rear cross bearing bracket.

Further, a gap is provided between the carbon brush set and the conductive slip ring which are in a sliding fit.

Further, the outer rotor dome is mounted at the front end of the outer rotor rotating body, and the spindle dome is mounted at a center of the front cross bearing bracket.

The invention has the following beneficial effects: the invention can use an electric aircraft, an electric passenger train, and an long-distance electric vehicle as a carrier to build a mobile power generation device, use air force generated during flying or driving, open up the field of clean energy utilization, and reduce consumption of mineral energy, thus increasing supply electric energy for the electric aircraft, the high-speed electric passenger train and long-distance electric vehicle to increase the endurance time thereof.

Figure 1:
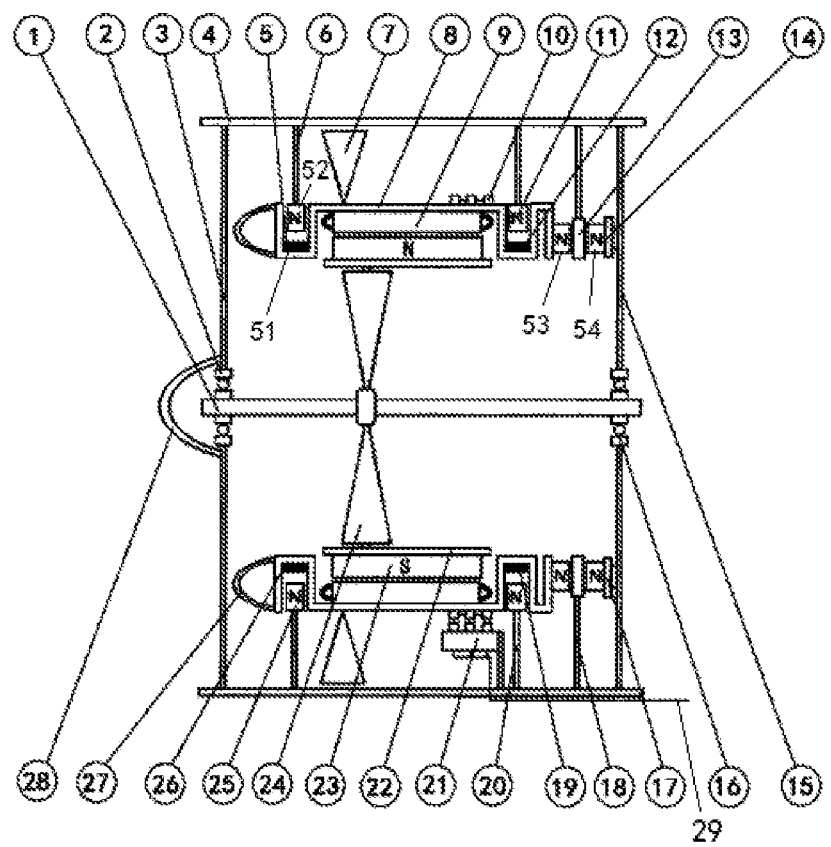
FIG. 1 is a side sectional view of a ducted and balanced wind turbine for an electric aircraft.

In the drawings: 1, spindle; 2, first spindle rolling bearing; 3, front cross bearing bracket; 4, turbine shell; 5, first radial magnetic levitation bearing; 6, first cross bracket; 7, outer rotor vortex blade; 8, outer rotor rotating body; 9, outer rotor armature coil; 10, conductive slip ring; 11, second cross bracket; 12, second radial magnetic levitation bearing; 13, first cross thrust bracket; 14, first axial magnetic levitation bearing; 15, rear cross bearing bracket; 16, second spindle rolling bearing; 17, second axial magnetic levitation bearing; 18, second cross thrust bracket; 19, third radial magnetic levitation bearing; 20, third cross bracket; 21, carbon brush set; 22, inner rotor rotating body; 23, permanent magnet; 24, inner rotor vortex blade; 25, fourth cross bracket; 26, fourth radial magnetic levitation bearing; 27, outer rotor dome; 28, spindle dome; 29, output wire; 51, first pole; 52, second pole; 53, third pole; 54, fourth pole; 61, turbine shell of motor; 62, driving blade of motor; 63, cross bracket of motor; 60, motor; 64, hanging bracket for aircraft wing.

DETAILED DESCRIPTION OF EMBODIMENTS

Figure 2:
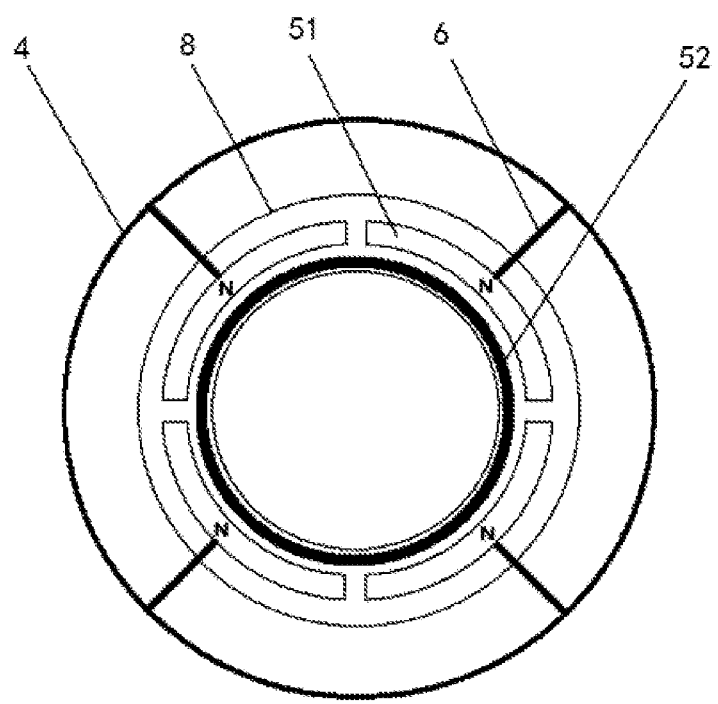
FIG. 2 is a front view of a radial magnetic levitation of the ducted and balanced wind turbine for the electric aircraft.
Figure 3:
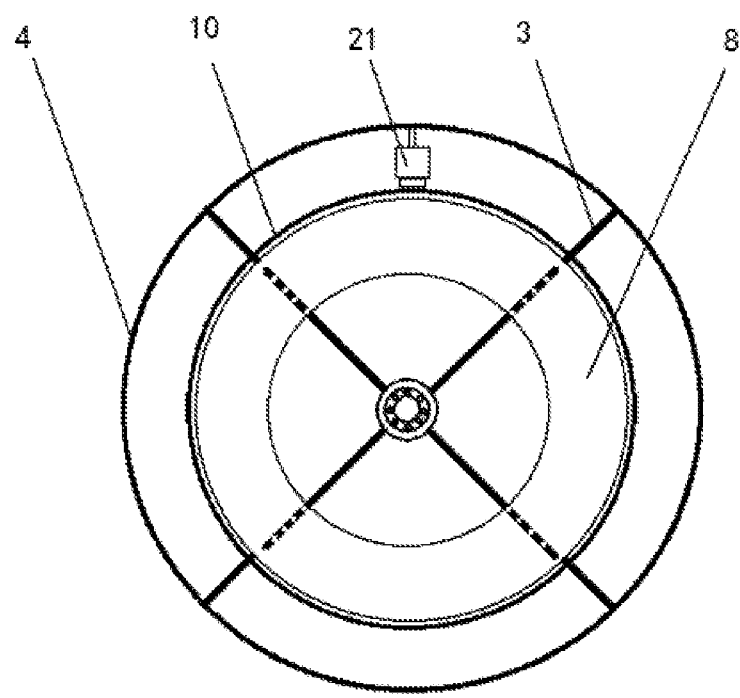
FIG. 3 is a front view of an outer rotor coil power transmission slip ring and a carbon brush set of the ducted and balanced wind turbine for the electric aircraft.

First, specific embodiments of the invention are described with reference to the drawings. As shown in FIGS. 1-3, a ducted and balanced wind turbine, comprising: a spindle 1, a front cross bearing bracket 3, a first radial magnetic levitation bearing 5, a second radial magnetic levitation bearing 12, a third radial magnetic levitation bearing 19, a fourth radial magnetic levitation bearing 26, a first cross bracket 6, a second cross bracket 11, a third cross bracket 20, a fourth cross bracket 25, an outer rotor vortex blade 7, a turbine shell 4, an outer rotor rotating body 8, an outer rotor armature coil 9, a conductive slip ring 10, a first cross thrust bracket 13, a second cross thrust bracket 18, a first axial magnetic levitation bearing 14, a second axial magnetic levitation bearing 17, a rear cross bearing bracket 15, a first spindle rolling bearing 2, a second spindle rolling bearing 16, an output wire 29, a carbon brush set 21, a permanent magnet 23, an inner rotor rotating body 22, an inner rotor vortex blade 24, an outer rotor dome 27 and a spindle dome 28.

According to the basic design principle of the structure of the wind turbine, the turbine shell 4 of the wind turbine serves as the overall foundation of the structure of the ducted and balanced wind turbine, and is similar to a stator structure of a conventional wind turbine.

The front cross bearing bracket 3 and the rear cross bearing bracket 15 are mounted in the turbine shell 4 of the wind turbine, and are equivalent to end covers of a stator structure of the conventional wind turbine.

The spindle 1 is mounted in the front cross bearing bracket 3 and the rear cross bearing bracket 15 through the first spindle rolling bearing 2 and the second spindle rolling bearing 16.

The inner rotor rotating body 22 and the permanent magnet 23 are fixedly connected into a whole by the inner rotor vortex blade 24, and are mounted on the spindle 1 to form a hollow design structure of the inner rotor. The spindle 1 can rotate freely in the center position of the turbine shell 4 of wind turbine; the front cross bearing bracket 3 and the rear cross bearing bracket 15 supporting the spindle 1 have a ventilation performance of approximately 90% or more, thus ensuring that the inner rotor vortex blade 24 and the outer rotor vortex blade 7 receive sufficient wind energy in the air during the flight of the electric aircraft.

The first cross bracket 6, the second cross bracket 11, the third cross bracket 20, the fourth cross bracket 25, the first cross thrust bracket 13, the second cross thrust bracket 18 and the carbon brush set 21 are mounted in the turbine shell 4 of the wind turbine. A gap is provided between the carbon brush set 21 and the conductive slip ring 10 which are in a sliding fit. Through the first radial magnetic levitation bearing 5, the second radial magnetic levitation bearing 12, the third radial magnetic levitation bearing 19, the fourth radial magnetic levitation bearing 26, the first axial magnetic levitation bearing 14 and the second axial magnetic bearing device 17, the outer rotor rotator 8 of the wind turbine is suspended in the turbine shell 4 of the wind turbine.

The structure of the outer rotor is based on the outer rotor rotating body 8. The outer rotor armature coil 9 is positioned outside the permanent magnet 23 and fixedly mounted on the inner wall of the outer rotor rotating body 8. A gap is provided between the outer rotor armature coil 9 and the permanent magnet 23. The outer rotor vortex blade 7 and the conductive slip ring 10 are mounted outside the outer rotor rotating body 8. The first poles 51 of the first radial magnetic levitation bearing 5, the second radial magnetic levitation bearing 12, the third radial magnetic levitation bearing 19, and the fourth radial magnetic levitation bearing 26 are disposed at the outer rotor rotating body 8. The second poles 52 which have the same polarity with the first poles 51 are respectively arranged on the ends of first cross bracket 6, the second cross bracket 11, and the third cross bracket 20, the fourth cross bracket which are far from the inner wall of the turbine shell 4. The third poles 53 of the first axial magnetic levitation bearing 14 and the second axial magnetic levitation bearing 17 are mounted on a rear of the outer rotor rotating body 8; fourth poles 54 which have the same polarity with the third poles 53 are installed at the rear cross bearing bracket 15, thus forcing the outer rotor rotator 8 to rotate relative to the inner rotor rotator 22 of the wind turbine. The inner rotor vortex blade 24 and the outer rotor vortex blade 7 have different inclination angles, forming a pair of tangential forces with an opposite energy direction, so that the inner rotor rotating body 22 and the outer rotor rotating body 8 of the wind turbine rotate in opposite directions. In one embodiment, the inner rotor rotating body 22 rotates clockwise, and the outer rotor rotating body 8 rotates counterclockwise.

First poles 51 of the first radial magnetic levitation bearing 5, the second radial magnetic levitation bearing 12, the third radial magnetic levitation bearing 19, and the fourth radial magnetic levitation bearing 26 are arranged on the outer rotor rotating body 8; second poles 52 which have the same polarity with the first poles 51 are respectively arranged on ends of the first cross bracket 6, the second cross bracket 11, and the third cross bracket 20, the fourth cross bracket 25 which are far from the inner wall of the turbine shell 4; third poles 53 of the first axial magnetic levitation bearing 14 and the second axial magnetic levitation bearing 17 are mounted on a rear of the outer rotor rotating body 8; fourth poles 54 which have the same polarity with the third poles 53 are mounted on the rear cross bearing bracket 15.

Optionally, the outer rotor dome 27 is mounted at a front end of the outer rotor rotating body 8, and the spindle dome 28 is mounted at a center of the front cross bearing bracket 3.

Figure 4:
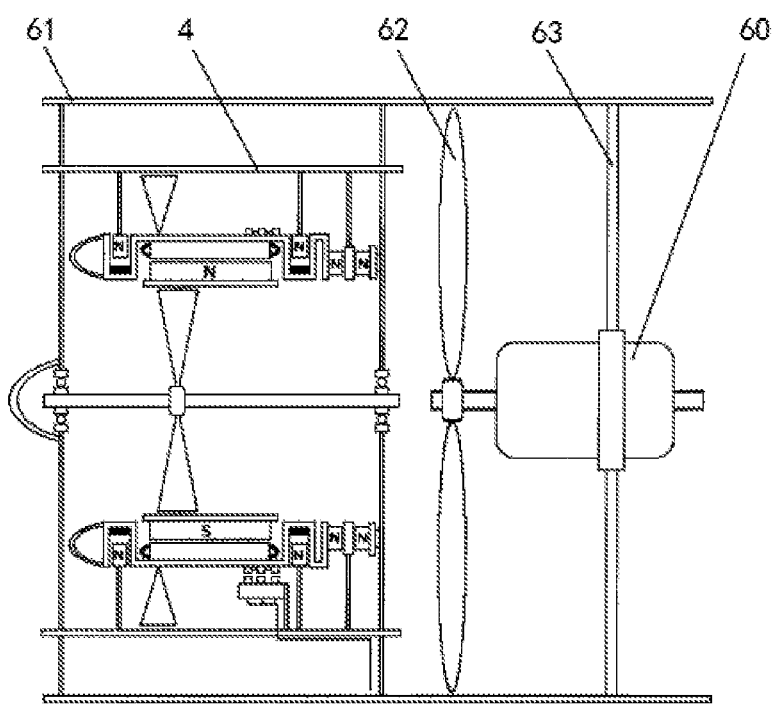
FIG. 4 is a cross-sectional diagram of the ducted and balanced wind turbine and a motor for an electric aircraft.
Figure 5:
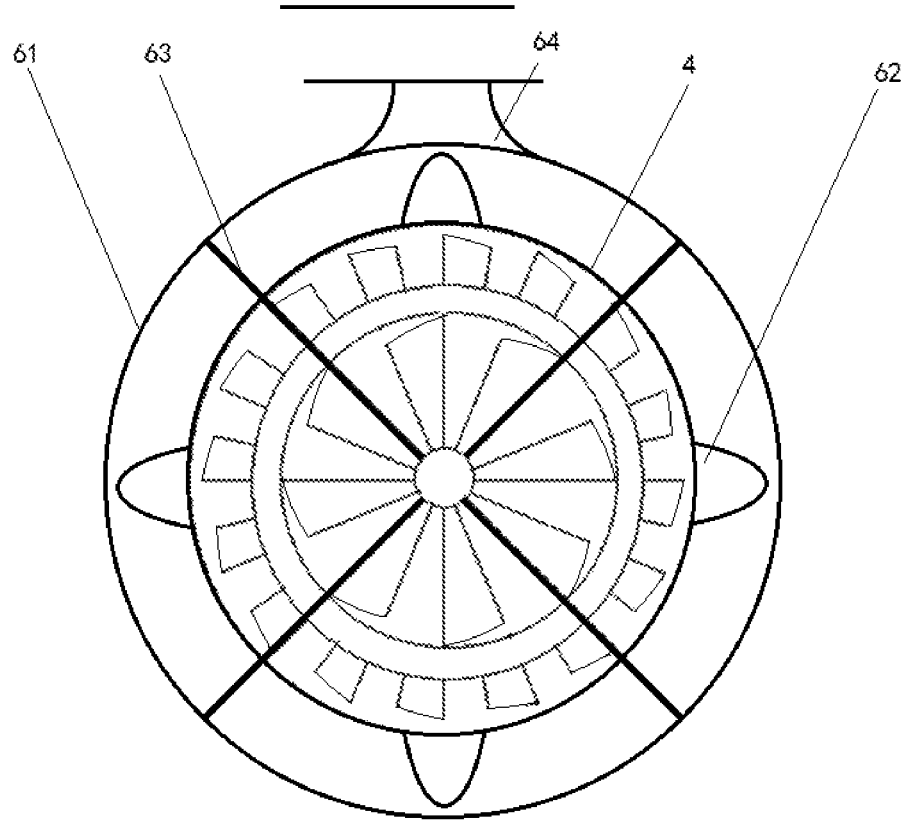
FIG. 5 is a front view of the ducted and balanced wind turbine and the motor for an electric aircraft.

Finally, the ducted and balanced wind turbine and the drive motor are combined in a main duct and mounted under the wing of the electric aircraft. As shown in FIGS. 4 and 5, the turbine shell 4 of the wind turbine is positioned in the turbine shell of motor 61, and the motor 60 is positioned in the rear of the ducted and balanced wind turbine.

The motor 60 is arranged in the turbine shell of motor 61 by a motor cross mounting bracket 63. A front end of the motor 60 is provided with a driving blade 62 of the motor for driving the aircraft. An upper part of the turbine shell 61 of motor is provided with a hanging bracket 64 for aircraft wing.

The technical solutions of the present invention are analyzed as follows. Wind power generation technology is a process of converting power energy by using wind energy in nature, driving fan blades to drive rotor armature coils to rotate, cutting magnetic lines of force of stator magnetic field. It can be completely confirmed that wind power generation technology is an one-to-one conversion process between the energy intensity in wind power and the energy intensity of the magnetic field of the wind turbine. Assuming that the stator of the wind turbine is not provided with a magnetic field, or the rotor armature circuit of the wind turbine is in an open circuit state, the magnetic field of the wind turbine will not produce a blocking effect on the electromotive force of the rotor armature coil. The blades that drive the rotor of the wind turbine are affected by the wind and will rotate as fast as a windmill until the blades are broken. The working principle of the motor is the inverter condition principle of the wind turbine. The output power of the motor rotor depends on the strength of the magnetic field set up by the electric energy in the motor stator. Therefore, in the wind power generation technology, the power produced by the wind turbine depends on the energy in the wind but not on the strength of the magnetic field energy.

If the intensity of the normal magnetic field of the wind turbine is set to exceed the wind energy driving the vortex blades of the wind turbine, the vortex blades cannot drive the rotor to rotate to cut the magnetic lines of force of the stator magnetic field. At this time, the vortex blades of the wind turbine directly form the air resistance situation, thus increasing the energy consumption of the electric aircraft and conforming to the formal theory of the law of conservation of energy. According to mutual identification of the principles of a generator and a motor, the energy conversion process of a wind turbine can be abstracted theoretically, which is ultimately a one-to-one conversion process between the energy intensity in wind power and the energy intensity of a magnetic field of the wind turbine.

According to the basic characteristics of energy conversion of wind turbine, it can be concluded that the power generation of wind turbine is equal to the resistance power of the energy of the magnetic field of the wind turbine, which is completely in line with the logic reasoning of energy conversion. Therefore, if the wind turbine is mounted on a flying electric aircraft, the magnetic field resistance will be converted into the most fatal air resistance of the electric aircraft. If the ducted and balanced wind turbine overcomes this technical problem, it can force the air resistance generated by the magnetic field energy of the wind turbine not to be transferred to the fuselage of the electric aircraft, which means that the wind turbine uses the carrier of the electric aircraft to capture the energy in the air resistance instantly and convert it into power energy.

Therefore, after theoretically determining that the air resistance produced by the magnetic field energy of the wind turbine is the largest resistance factor for the wind turbine, it is not surprising that the technology of the ducted and balanced wind turbine is used in the electric aircraft in order to extend the endurance time of the electric aircraft.

However, in the nature, natural wind with opposite directions and equal energy will never appear at the same time. Only by technical means can a pair of equal energy forces be created artificially in the air fluid. Such wind is respectively acted on the inner and outer rotor vortex blades of the wind turbine, the electric aircraft has a relative motion relationship with the relatively static air in flight, and generates a single direction air fluid at all times. The vortex blade of the wind turbine mounted on the electric aircraft will also be affected by the air resistance.

According to the physical characteristic that gas can be freely divided in hydrodynamics, at the moment when the air touches the inner rotor vortex blade 24 and the outer rotor vortex blade 7 of the wind turbine, the air is automatically divided into two driving forces with equal action according to the resistance area of the vortex blade, and a pair of tangential forces with equal energy and opposite directions are further formed according to different inclination angles of the inner rotor vortex blade 24 and the outer rotor vortex blade 7, so that the inner rotor rotating body 22 and the outer rotor rotating body 8 of the wind turbine rotate in opposite directions to complete the process of power energy conversion by cutting the magnetic lines of force of the magnetic field. Therefore, as long as the resistance of the magnetic field energy of a wind turbine is balanced in the turbine shell of the wind turbine, it is completely possible to use the energy in the air resistance on the flying electric aircraft to prolong the endurance time of the electric aircraft without raising the power consumption of the electric aircraft.

Obviously, the above embodiments are only illustrative, and are not intended to limit the scope of the present invention. For those of ordinary skill in the art, various changes or modifications can be made on the basis of the above description. It is impossible to describe all embodiments of the present invention herein. Any obvious change or variation derived from the technical solution of the invention shall fall within the scope of the invention.

What is claimed is:

1. A ducted and balanced wind turbine, comprising: a spindle, a front cross bearing bracket, a first radial magnetic levitation bearing, a second radial magnetic levitation bearing, a third radial magnetic levitation bearing, a fourth radial magnetic levitation bearing, a first cross bracket, a second cross bracket, a third cross bracket, a fourth cross bracket, an outer rotor vortex blade, a turbine shell, an outer rotor rotating body, an outer rotor armature coil, a conductive slip ring, a first cross thrust bracket, a second cross thrust bracket, a first axial magnetic levitation bearing, a second axial magnetic levitation bearing, a rear cross bearing bracket, a first spindle rolling bearing, a second spindle rolling bearing, an output wire, a carbon brush set, a permanent magnet, an inner rotor rotating body, an inner rotor vortex blade, an outer rotor dome, and a spindle dome; wherein:

the spindle is mounted in the turbine shell of the wind turbine through the front cross bearing bracket and the rear cross bearing bracket;

the first spindle rolling bearing is arranged between the spindle and the front cross bearing bracket, and the second spindle rolling bearing is arranged between the spindle and the rear cross bearing bracket;

the inner rotor vortex blade is fixedly mounted on the spindle; the inner rotor rotating body is fixedly mounted on the inner rotor vortex blade; the permanent magnet is fixedly mounted on the inner rotor rotating body;

the outer rotor armature coil is positioned outside the permanent magnet and is fixedly mounted inside the outer rotor rotating body; a gap is provided between the outer rotor armature coil and the permanent magnet; the outer rotor vortex blade and the conductive slip ring are fixedly mounted outside the outer rotor rotating body;

the first radial magnetic levitation bearing, the second radial magnetic levitation bearing, the third radial magnetic levitation bearing, and the fourth radial magnetic levitation bearing are respectively installed at an inner wall of the turbine shell via the first cross bracket, the second cross bracket, the third cross bracket and the fourth cross bracket; the first axial magnetic levitation bearing and the second axial magnetic levitation bearing are fixedly installed at the rear cross bearing bracket; the carbon brush set is located outside the conductive slip ring and fixedly mounted on the inner wall of the turbine shell; and the outer rotor rotating body rotates inside the turbine shell through the first radial magnetic levitation bearing, the second radial magnetic levitation bearing, the third radial magnetic levitation bearing, the fourth radial magnetic levitation bearing, the first axial magnetic levitation bearing and the second axial magnetic levitation bearing; the inner rotor vortex blade and the outer rotor vortex blade have different inclination angles, forming a pair of tangential forces which have the same energy and opposite directions, so that the inner rotor rotating body and the outer rotor rotating body of the wind turbine rotate in opposite directions.

2. The ducted and balanced wind turbine of claim 1, wherein the spindle is positioned at a center of the turbine shell of the wind turbine.

3. The ducted and balanced wind turbine of claim 1, wherein one end of the first cross thrust bracket and the second cross thrust bracket are mounted on the inner wall of the turbine shell of the wind turbine.

4. The ducted and balanced wind turbine of claim 1, wherein first poles of the first radial magnetic levitation bearing, the second radial magnetic levitation bearing, the third radial magnetic levitation bearing, and the fourth radial magnetic levitation bearing are arranged on the outer rotor rotating body; second poles which have the same polarity with the first poles are respectively arranged on ends of the first cross bracket, the second cross bracket, and the third cross bracket, the fourth cross bracket which are far from the inner wall of the turbine shell; and third poles of the first axial magnetic levitation bearing and the second axial magnetic levitation bearing are mounted on a rear of the outer rotor rotating body; fourth poles which have the same polarity with the third poles are mounted on the rear cross bearing bracket.

5. The ducted and balanced wind turbine of claim 1, wherein a gap is provided between the carbon brush set and the conductive slip ring which are in a sliding fit.

6. The ducted and balanced wind turbine of claim 1, wherein the outer rotor dome is mounted at a front end of the outer rotor rotating body, and the spindle dome is mounted at a center of the front cross bearing bracket.

* * * * *